United States Patent

Jolivet

(10) Patent No.: US 8,186,591 B2
(45) Date of Patent: May 29, 2012

(54) CONTACTLESS MANAGEMENT BETWEEN A SMART CARD AND MOBILE TERMINAL

(75) Inventor: Paul Jolivet, Paris (FR)

(73) Assignee: LG Electronics Inc., Seoul (KR)

( * ) Notice: Subject to any disclaimer, the term of this patent is extended or adjusted under 35 U.S.C. 154(b) by 270 days.

(21) Appl. No.: 12/521,215

(22) PCT Filed: Jan. 18, 2008

(86) PCT No.: PCT/KR2008/000337
§ 371 (c)(1),
(2), (4) Date: Jun. 25, 2009

(87) PCT Pub. No.: WO2008/091079
PCT Pub. Date: Jul. 31, 2008

(65) Prior Publication Data
US 2010/0084465 A1   Apr. 8, 2010

Related U.S. Application Data

(60) Provisional application No. 60/886,896, filed on Jan. 26, 2007.

(51) Int. Cl.
*G06K 7/06* (2006.01)
(52) U.S. Cl. ......... 235/439; 235/380; 235/441; 235/492
(58) Field of Classification Search .......... 235/380, 235/441, 439, 492
See application file for complete search history.

(56) References Cited

U.S. PATENT DOCUMENTS

| | | | |
|---|---|---|---|
| 6,184,651 B1 | 2/2001 | Fernandez et al. | |
| 6,294,997 B1 | 9/2001 | Paratore et al. | |
| 7,163,154 B2 | 1/2007 | Palmade | |
| 2002/0040936 A1* | 4/2002 | Wentker et al. | 235/492 |
| 2005/0134213 A1 | 6/2005 | Takagi et al. | |
| 2005/0259673 A1* | 11/2005 | Lu et al. | 370/419 |
| 2006/0079284 A1* | 4/2006 | Lu et al. | 455/558 |
| 2006/0145818 A1 | 7/2006 | Kusakabe et al. | |
| 2006/0206710 A1* | 9/2006 | Gehrmann | 713/168 |
| 2006/0234778 A1 | 10/2006 | Matsushita et al. | |
| 2007/0005989 A1* | 1/2007 | Conrado et al. | 713/189 |
| 2007/0145135 A1 | 6/2007 | Jogand-Coulomb et al. | |
| 2007/0178938 A1* | 8/2007 | Kravitz et al. | 455/558 |
| 2007/0222602 A1 | 9/2007 | Luo et al. | |
| 2007/0293155 A1 | 12/2007 | Liao et al. | |
| 2008/0073426 A1* | 3/2008 | Koh et al. | 235/380 |
| 2008/0116264 A1 | 5/2008 | Hammad et al. | |
| 2008/0162357 A1* | 7/2008 | Gerardi et al. | 705/56 |
| 2009/0255988 A1* | 10/2009 | Di Luoffo et al. | 235/380 |
| 2010/0227588 A1* | 9/2010 | Bradley | 455/411 |
| 2010/0288839 A1* | 11/2010 | Adams et al. | 235/441 |

FOREIGN PATENT DOCUMENTS

| | | | |
|---|---|---|---|
| EP | 1 647 922 A1 | 4/2006 | |
| WO | WO-2005/101289 A1 | 10/2005 | |

* cited by examiner

*Primary Examiner* — Allyson Trail
(74) *Attorney, Agent, or Firm* — Birch, Stewart, Kolasch & Birch, LLP

(57) ABSTRACT

Certain existing commands, such as USAT/SAT/CAT commands, are modified to allow management of various types of contactless applications to be performed. Such commands are exchanged via a communication bus between a secure element and a contactless function (CLF) module to support a contactless service. The secure element may be a type of smart card and the external device may be an access gateway for transportation, a point-of-sale (PoS) terminal, or some other application for the user.

8 Claims, 4 Drawing Sheets

CONTACTLESS MANAGEMENT BETWEEN A SMART CARD AND MOBILE TERMINAL

The present disclosure claims priority benefit to U.S. Provisional Application No. 60/886,896 (filed Jan. 26, 2007), which contents are all incorporated by reference herein.

TECHNICAL FIELD

The present invention relates performing contactless management between a smart card and a mobile terminal.

BACKGROUND ART

The background art technologies related to smart cards do not sufficiently address the issues related to performing contactless management between a smart card and a mobile terminal, and thus do not offer appropriate solutions.

DISCLOSURE OF INVENTION

Technical Solution

The present inventor recognized some drawbacks of the background art. Based upon such recognition, the various features described hereafter have been conceived such that USAT and/or CAT commands, or the like, are used to perform contactless management for a smart card.

MODE FOR THE INVENTION

The inventive concepts and features described herein that are related to a contactless management will be explained in terms of implementation for a user terminal, such as a mobile phone. However, such details are not meant to limit the various features described herein, which are applicable to other types of devices.

Hereafter, the term "terminal" will be used to refer to various types of user devices, such as mobile communication terminals, user equipment (UE), mobile equipment (ME), and other devices that support various types of wireless communication technologies.

The definitions of some other terms used herein are provided as follows:

CAT: Common Application Toolkit (the generic part of USAT)

CLF: ContactLess Function (module)

ICC: Integrated Circuit Card (smart card)

ISO: International Standard Organisation.

ETSI: European Telecommunication Standard Institute (that is in charge of the UICC specification).

MMC: MultiMedia Card as defined by the MMC Association (By extension, the protocol can be defined on the card/reader interface).

UICC: Smart card platform supporting SIM, USIM, and other applications.

USB: Universal Serial Bus as defined by the USB Implementers' Forum (By extension, the protocol can be defined on the card/reader interface).

USIM: Universal SIM, UICC application including parameters and tools to identify and authenticate a 3G/UMTS user and to run its applications.

SIM: Subscriber Identity Module, UICC application including parameters and tools to identify and authenticate a GSM user and to run its applications.

SAT: SIM Application Toolkit as defined in 3GPP.

USAT: USIM Application Toolkit as defined in 3GPP.

The present invention relates to contactless management between a storage medium (such as a UICC or similar smart card) within a terminal and a functional module also within the terminal (such as a contactless function module (CLF) or the like).

It should be noted that mobile terminals under development (or to be developed in the near future) may have multiple card slots to receive more than one smart card. Also, the contactless function module (CLF) itself may removable by being implemented on a smart card or the like.

As the concepts and aspects described herein are applicable to smart cards (or other types of storage media and memories), various standards that are related to and support such smart card technologies (such as ISO/IEC, ETSI, GSM, 3GPP, 3GPP2, OMA, IEEE, etc.) are also part of the exemplary embodiments described herein. It can be understood that the above exemplary standards are not intended to be limiting, as other related standards and technologies would also be applicable to the various features and concepts described herein.

For example, a smart card can be considered to have a basic platform and various applications related thereto. The standardization to support the basic platform is handled by the ETSI, while the various applications are handled by different standard organizations. For example, the USIM and SIM features are handled by the 3GPP, the RUIM features is handled by the 3GPP2, certain financial applications are handled by EMV (Europay™, MasterCard™, Visa™), and the like.

A smart card (also referred to as a chip card, an integrated circuit card (ICC) or the like) is defined as any pocket-sized card with embedded integrated circuits that can process information. Various ICC applications can be used to receive inputs, perform processing thereon, and deliver outputs. There are two types of ICCs, namely memory cards and microprocessor cards. Memory cards contain non-volatile memory storage components, and some logic circuitry for security. Microprocessor cards contain volatile memory and microprocessor components. Such cards may be made of plastic or some other appropriate material and may have an embedded hologram or other security device to avoid counterfeiting.

Smart cards may be categorized as having a contact interface, a contactless interface, or both. These smart cards typically do not have their own battery or power source.

A contact-type smart card has a small chip (typically made of gold) that makes physical contact with electrical connectors of a smart card reader upon insertion of the smart card, such that information can be read from and written to the chip.

A contactless-type smart card communicates with a card reader through radio frequency identification (RFID) induction technology. Such contactless-type smart cards may also use near field communication (NFC), which is a short-range wireless communication technology that allows data exchanging between devices over a relatively short distance. NFC technology is based on RFID, which makes it compatible with the existing contactless infrastructure already in use for public transportation and payment applications. Also, in a contactless-type smart card, an inductor element can be used to capture and rectify incident RF signals in order to power the integrated circuits in the smart card.

A dual-interface card, namely, a smart card implemented with contactless and contact interfaces, may use shared storage and processing.

The term "contactless" may be used in reference to certain technologies, such as a contactless smart card, a proximity card, contactless payment, radio-frequency identification (RFID), near field communication (NFC), and the like.

The current standard for contactless smart card communications is ISO/IEC 14443 that defines two types of contactless cards (Types A and B) and allows for contactless communications at a distance of up to about 10 centimeters.

To provide enhanced services and applications, more and more terminals will implement to so-called contactless features. Such enhanced services can support transportation applications (e.g., fare payments for riding the subway, metro, buses, etc.), epurses (e.g., electronic financial transactions, e-banking, etc.), and the like.

The principle of the contactless feature is that a relatively low range medium is used between the terminal and a reader (for instance, a metro/subway turnstile or gate) to execute a fee transaction, to identify the user, or to perform some other type of function or application.

Some aspects regarding contactless features are described in U.S. Patent Application Publication Numbers 2007/0145133 and 2007/0200003, both assigned to the same assignee of the present disclosure, and incorporated herein by reference.

For security and service management reasons, it is likely that the UICC (the telecommunication smart card supporting SIM/USIM) will manage at least part of the contactless services/applications, therefore implementations must consider a physical or logical interface with the UICC.

For technical reasons (such as, electromagnetic constraints (EMC), antenna implementation, etc.), it is impossible (or at least very difficult) to implement all (or the desired or necessary) contactless features in the smart card (UICC). At least part of such features shall be supported in a contactless function module (i.e., a functional entity implemented in hardware, software, or a combination thereof to support contactless services and/or applications), which is part of the terminal.

Figure 1:
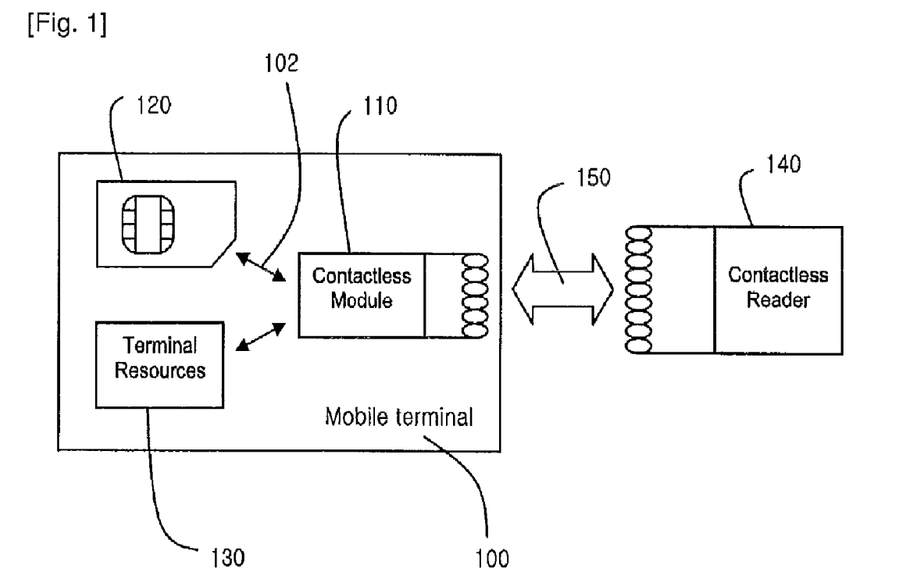
FIG. 1 shows an example of how a mobile terminal and a contactless reader can cooperate with each other.

FIG. 1 shows an example of how a mobile terminal and a contactless reader can cooperate with each other. The mobile terminal 100 has a contactless module 110 that interacts with a smart card 120 and with various terminal resources 130. When the mobile terminal 100 is placed at or near a contactless reader 140, wireless communications can be performed with the contactless module 110 via a wireless (or contactless) interface 150.

As an example of a smart card 120, the UICC is a smart card platform that supports various telecommunication applications, such as SIM (for GSM) or USIM (for 3G). The UICC can also support other types of applications. The UICC is the evolution of the GSM SIM card that was only able to run SIM applications.

The UICC continues to evolve with respect to two aspects; 1) employing a large memory and high-speed interface, and 2) supporting contactless services.

A large memory and high-speed interface allow the UICC to support more applications, personal data of the user, certificate procedures, etc. without having trouble in transferring large amounts of data within a reasonable timeframe.

Contactless services address the market of integrating access control services, transportation passes, and the like into the mobile terminal. The UICC would be used in such cases to secure information and applications, whereas for reasons detailed below, most of the actual contactless link management (modulation, power control and management, etc.) would be made in the mobile terminal.

Figure 2:
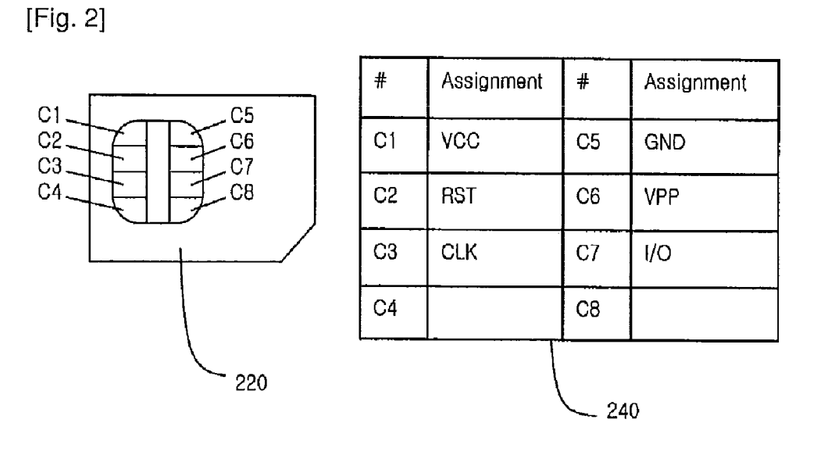
FIG. 2 shows an example of a smart card (UICC) 220 having a particular allocation for eight (8) physical contacts, as indicated by the chart 240.

FIG. 2 shows an example of a smart card (UICC) 220 having a particular allocation for eight (8) physical contacts, as indicated by the chart 240.

Although it can be understood that the features of the present invention can also be adapted and implemented to smart cards with a different number of physical contacts, the exemplary embodiments will focus on an 8-contact type UICC.

The physical interface between the UICC and mobile terminal can be based on an 8-contact module. It is currently unlikely that more contacts can be implemented in the future. Therefore, all extensions have to be considered based on the existing contacts, and minimum backward compatibility requirements, such that a session can be always opened on the ISO T=0 protocol, as defined in the ISO 7816 series.

Therefore, only 3 contacts are remaining for further development. Currently, 2 contact candidates are considered for a High-Speed interface between the UICC and the terminal. Additionally, MMC can be implemented by using the C4/C6/C8 contacts, and USB can be implemented by using the C4/C8 contacts.

In order to obtain a physical interface for connection with an external contactless module (such as, via a two-wire based connection), there is a need for either adding new contacts (which is unlikely to be adopted) or to multiplex the signals on the existing contacts that would be used for several logical interfaces (which is heavy or burdensome to support and requires much software and probably hardware).

The basic principle described herein is to provide a solution using an existing interface. Among the different proposals regarding contactless services implementation, some focus on supporting mobility, as most of the functionality cannot be implemented within the UICC. Rather than splitting the functionality between the terminal, the UICC, and an independent module of the terminal, this invention proposes to centralize most of the functions within the terminal, including a controller (such as a contactless function module (CLF)) that the smart card (UICC) can access in a secure manner.

In this context, this invention also proposes to enhance existing (U)SAT commands to communicate with this controller and module. Two solutions are provided for exemplary purposes, and can be expressed as a Bearer Independent Protocol (BIP) and second ($2^{nd}$) card reader commands (i.e., commands for an additional card reader).

The UICC implements more and more protocols on its interface. Due to the limitations of the physical interface, the techniques of either multiplexing signals or using the same physical interface for multiple uses via a compatible means need to be considered.

The principle of this invention is to reuse existing mechanisms to communicate through the existing ISO interface between the UICC and the contactless module. This is based on the appropriate extension of some existing commands (such as (U)SIM Application Toolkit commands (SAT or USAT)), to thus support either the Bearer Independent Protocol (BIP) and/or additional (second) card reader commands. A communication channel can then easily be established with the contactless module to activate it and exchange information, while causing only minimal impact to the terminal.

The technical aspects with respect to Card Application Toolkit (CAT) characteristics can be found in various standard documents related to smart cards and the Card Application Toolkit (CAT), which are applicable to this invention.

Some concepts related to the Card Application Toolkit (CAT) (in particular, OPEN CHANNEL, CLOSE CHANNEL, SEND DATA, RECEIVE DATA, and GET CHANNEL STATUS) will now be explained.

A proactive UICC service provides a mechanism which stays within the T=0 and T=1 protocols, but adds a new status response word (SW1). This status response has the same meaning as the normal ending ('90 00'), and can be used with most of the commands that allow the normal ending, but it also allows the UICC to tell the terminal that there is some information to be sent to the terminal. The terminal then used a FETCH function to find out what this information is. To avoid cross-phase compatibility problems, these functions shall only be used between a proactive UICC and a terminal that supports proactive UICC commands. The UICC can issue a variety of commands.

The OPEN CHANNEL command requests the terminal to open a data channel with parameters indicated in the command. The CLOSE CHANNEL command requests the terminal to close the specified data channel. The SEND DATA command requests the terminal to send, on the specified channel, data provided by the UICC. The RECEIVE DATA command requests the terminal to return to the UICC, data received on the specified channel. The GET CHANNEL STATUS command requests the terminal to return the current status of all available data channels. For these commands, it is assumed that class "e" is supported.

A set of commands originally designed to access a second (or additional) card reader (such as, POWER ON CARD, POWER OFF CARD, GET READER STATUS) may also be applicable. Namely, the POWER ON CARD command initiates a session with the additional card and returns all the ATR bytes. The POWER OFF CARD command closes the session with the additional card. The GET READER STATUS command gives information about the additional reader (s) and inserted card(s), such as, the presence of an additional card, whether an additional card is powered on or not, and the like. For these commands, it is assumed that class "a" is supported.

It should be noted that communication with Bluetooth™ or IrdA modules (or other hardware and/or software modules that support close-range or near-field communications) are supported.

As the most complicated part (i.e., hardware implementation) of the contactless functionality will be deported in the terminal, this invention relates to another way of implementing it as part of the terminal, but still being logically linked with the smart card (UICC).

This invention proposes a solution to access the contactless functionality in that context through the enhancement of (U)SIM Application Toolkit commands.

This can be achieved based on the assumption that the entire contactless functionality is terminal-based and consists in enhancing existing UICC communication channels and commands to manage the contactless module and its functionality.

The main assumption of this invention proposal is that the contactless module is completely controlled by the terminal.

Figure 3:
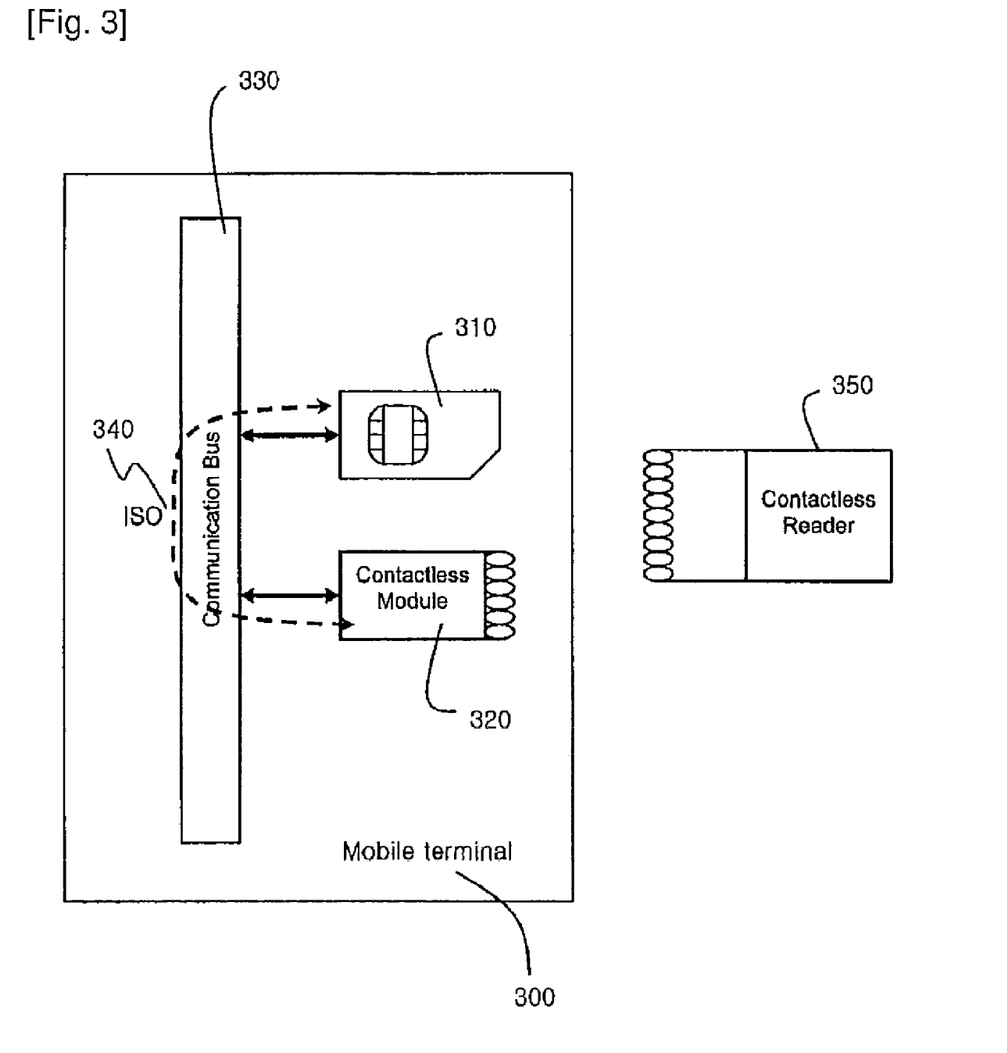
FIG. 3 shows an example of how a secure element (smart card) and a contactless module within a mobile terminal cooperate via a communication bus.

FIG. 3 shows an example of how a secure element (smart card) and a contactless module within a mobile terminal cooperate via a communication bus.

A mobile terminal 300 and a contactless reader 350 can cooperate through near-field communications (NFC) or other close-range wireless (contactless) technology to carry out a contactless application or function, such as a financial transaction, a transportation pass, user identification, or the like.

The mobile terminal 300 may include a secure element 310 (such as, a smart card, a UICC, etc.) and a contactless module 320 (such as, a contactless function module (CLF), etc.), which can communicate (i.e., exchange data and information) with each other (and with other components in the mobile terminal 300) via a communication bus 330 (or other communication medium). Such communication bus 330 can support the exchange of protocol commands and instructions 340 (such as those specified by the ISO standard).

As explained previously, the contactless hardware is independent from the UICC, although it could interact with the module through the terminal communication bus and logical links. Note that although FIG. 3 relates to a terminal in a contactless card emulation mode, it also applies when the mobile contactless function is used as a reader.

This invention proposes to reuse and enhance existing (U)SAT commands to communicate between the UICC and the contactless module. This proposal can easily be enhanced to be even more secure and efficient with a dedicated protocol, to be defined.

Two channels can be used between the UICC and the contactless modules:

1. Bearer Independent Protocol (BIP) Solution

The principle of BIP is to send data (and recipient details) into a terminal buffer and to rely on the terminal to send the data on the mentioned (or most accurate) link on which a channel is opened. The communication can currently be handled on the following bearers: Circuit Switched (CS), Packet Switched (PS) or Local bearer. Here, two implementations are relevant.

First, the contactless module in the terminal can be managed as a local bearer. In that case, the only implementation requirement is to enhance the addressing system so that the contactless module becomes visible from the UICC as Bluetooth™ or IrdA modules are. Then the card can send already formatted data to the module the same way it communicates today with external server through local bearers. Note that if the contactless module is supporting several contactless protocols, it can either be addressed as separate bearers or as different classes of the same bearers.

Second, the contactless module in the card can be managed as a new specific bearer. This requires more specification work, however it ease the implementation, allowing specific parameters to be defined rather than encapsulating data in generic blocks.

Both implementations imply that additions (i.e., modification, extensions, parameter definitions, etc.) to the relevant technical specifications (such as in ETSI) are needed.

2. Additional (or Second) Card Reader Solution

The principle of accessing a second (or additional) card reader was initially specified so that UICC can interact with an additional smart card in a multiple-slot smart card terminal. The intended use was for making payment transactions via the terminal. This was considered as a secure way of using a point-of-sale (PoS) terminal in a shop. However, practical implementations failed because the market was too small at the time when the project was launched. Still, the commands are available for use.

The contactless module can be identified by the UICC as a new card in the sense of the current standards. This just implies that a ISO interface/protocol is developed on the contactless module so that it communicates with the terminal as a smart card. The communication channel can easily be granted by the terminal implementing the feature and then data may be exchanged.

Figure 4:
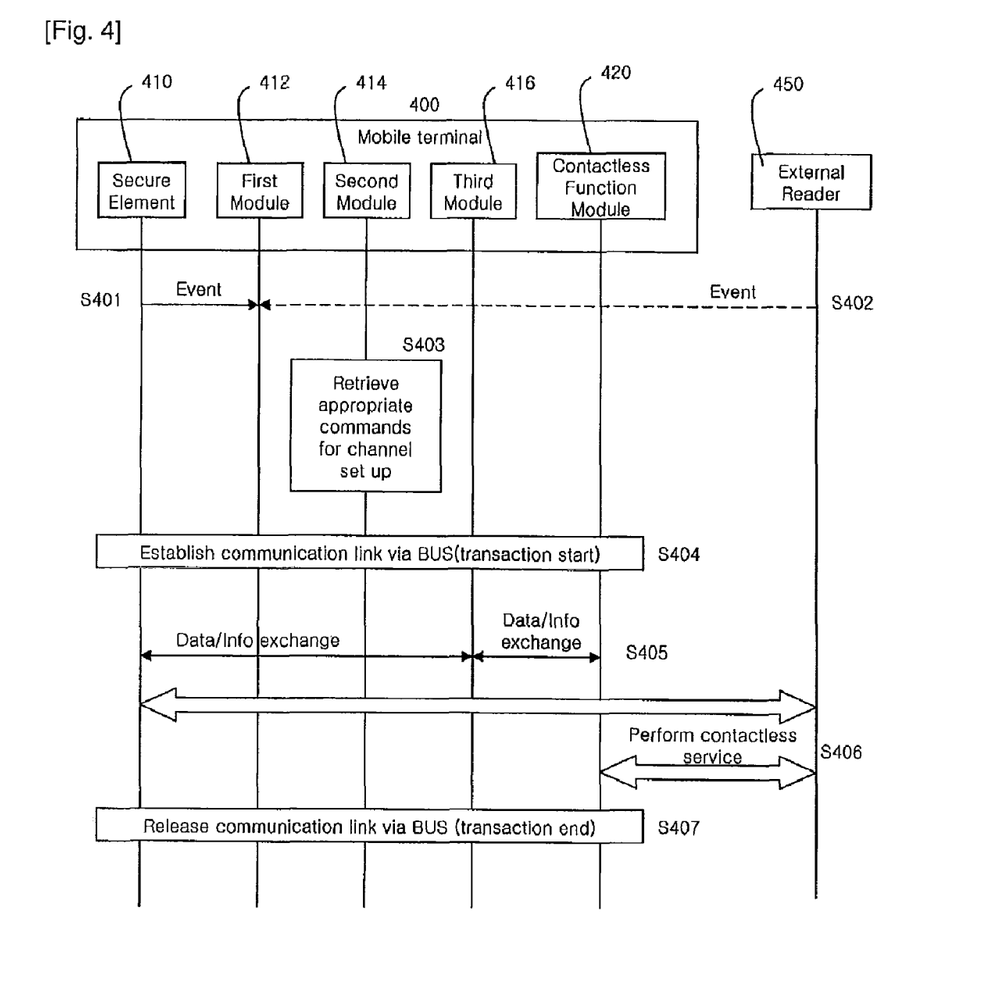
FIG. 4 shows an exemplary signal flow of how a mobile terminal having a secure element and various functional modules cooperate with an external (contactless) reader.

FIG. 4 shows an exemplary signal flow of how a mobile terminal having a secure element and various functional modules cooperate with an external (contactless) reader.

A mobile terminal 400 and an external reader 450 can cooperate to support and perform contactless applications of functions for financial transactions, transportation access, user identification, or the like. The mobile terminal 400 may include a secure element 410 (such as a smart card, UICC, etc.), a contactless function module 420 (such as a CLF), and various modules (i.e., a first module 412, a second module 414, a third module 416) that support the contactless management between the secure element 410 and various components in the mobile terminal 400.

The first module 412 can detect the occurrence of an event (S401 or S402), such as a request to begin a contactless application. Such event may be initiated from the mobile terminal itself (namely, by the secure element 410) or from the external reader 450.

Upon such event detection, the second module 414 then retrieves appropriate commands (e.g., modified USAT commands) in order to perform the appropriate channel set up procedures (S403). Then, a communication link(s) between the secure element 410, the modules (412, 414, 416), and the contactless function module 420 is established via a communication bus (that can support the ISO standard) in order to start a transaction (S404). Thereafter, the third module 416 performs the necessary operations to allow data and/or information to be exchanged between the secure element 410 and the contactless function module 420 (S405).

As a result, the desired contactless service (application or function) can be performed with the external reader 450 (S406). If the transaction is completed or when the transaction ends, the communication link via the communication bus is appropriately released (S407). Subsequently, another event may then be detected and the above-described steps and procedures can be repeated as necessary.

Figure 5:
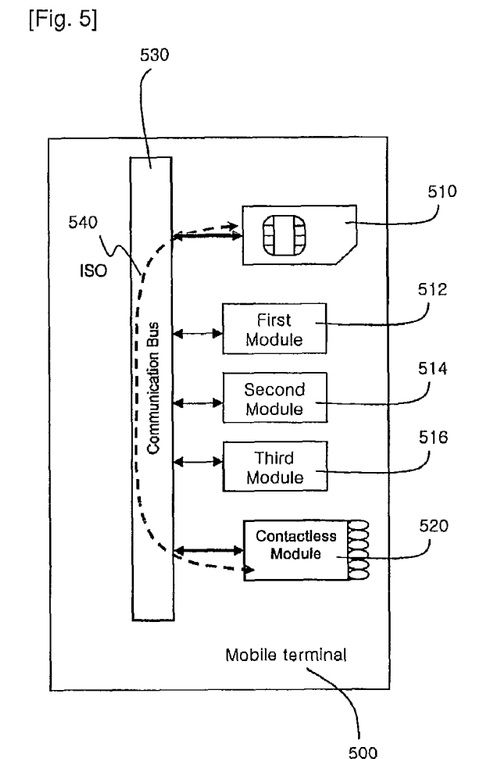
FIG. 5 shows an exemplary mobile terminal structure having a secure element, a contactless module, and other functional modules all operatively connected to a communication bus.

FIG. 5 shows an exemplary mobile terminal structure having a secure element, a contactless module, and other functional modules all operatively connected to a communication bus.

Such hardware components are used to achieve the procedures described above with respect to FIG. 4. Namely, the mobile terminal 500 may include a secure element 510 (i.e., smart card, UICC, etc.), a contactless module 520, and first to third modules (512, 514, 516) that are all physically and/or logically connected to a communication bus 530 (or other appropriate type of data exchange medium). Here, the communication bus 530 may support an appropriate technical standard (such as ISO) to allow data and/or instructions (540) to be exchanged between the secure element 510 and the contactless module 520.

Figure 6:
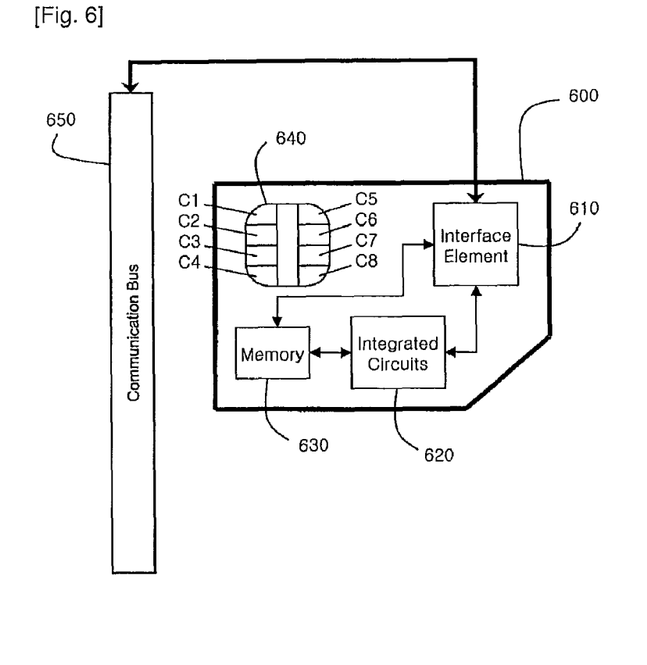
FIG. 6 shows an exemplary structure for a smart card (or similar element) that employs an interface element that allows connection with a communication bus to supporting contactless management between the smart card and the mobile terminal.

FIG. 6 shows an exemplary structure for a smart card (or similar element) that employs an interface element that allows connection with a communication bus to supporting contactless management between the smart card and the mobile terminal.

An exemplary smart card 600 can have an interface element 610 that allows communication between the smart card (i.e., integrated circuits 620 and memory 630) and certain components of a mobile terminal that receives the smart card. Also, a chip 640 with numerous physical contacts may be part of the smart card.

Referring to FIG. 6, a smart card (600) comprises a memory (630) to store information related to supporting contactless applications and an interface element (610) operatively connected with the memory (630) and a communication bus (650) to allow components of a mobile terminal to access the memory (630) via the communication bus (650) using extended commands that are related to Bearer Independent Protocol (BIP) or related to supporting an additional card reader and perform a contactless function with an external terminal.

The smart card (600) further comprises embedded integrated circuits (620) that cooperate with the memory (630) and the interface element (610) to receive inputs, process information, and deliver outputs to perform the contactless function. The interface element can support an ISO-based protocol standard.

This invention considerably eases the implementation of the contactless feature in the terminals. The user has the transportation application and rights on its UICC. When the terminal is presented to the metro gateway, the contactless module wakes up the UICC application to grant the access. This proposal allows to enable at the same time High Speed inteiface and Contactless interface without multiplexing signals nor reusing ISO or High Speed protocols for contactless. Accordingly, this invention (1) solves issue of concurrent access to the contactless module by both the UICC and the terminal: as the terminal centralise the functionality, it manages the access, (2) simplifies the terminal internal design: simple controller and no new specific UICC physical and logical interface to create, and (3) allows fast standardisation work as it only oblige to enhance existing CAT/USAT commands.

Other possible solutions may be based on: (1) signal multiplexing which implies a significant complexity and restricts this solution to the only MMC, the USB signal being unlikely to be multiplexed, (2) reusing the high speed inteiface to communication with an external module for contactless, removing the whole contactless management from the UICC, and relying on the only terminal to implement the whole feature, and (3) adding new contacts. However, these are all more expensive to implement and heavier for the terminal to support, as compared with the solutions provided by this invention.

As described thus far, the concepts and features related to a contactless interface between a smart card and a contactless function module to support various contactless service can also be summed up as follows.

The present invention provides a method of communication between a smart card and a contactless function module (CLF), comprising: receiving an event, by at least one of a smart card and a device, that indicates a need to establish a channel between the smart card and the CLF; setting up, by at least one of the smart card and the CLF, the channel by using an extension of commands for supporting smart cards; and transmitting data, between the smart card and the CLF, via the channel.

The smart cart may be a UICC. The commands are extended Card Application Toolkit (CAT) commands. The extended CAT commands are related to Bearer Independent Protocol (BIP) or second card reader commands. For BIP, an open channel command can address the CLF to establish an accurate channel for contactless transactions. Also for BIP, the terminal can manage data blocks in accordance with the contactless protocol requirements. The communication to the CLF is considered as a local connection. For the second card reader, the CLF can emulate a smart card communication with the UICC. Also, for the second card reader, the terminal supports the contactless protocol requirements. Additionally, for the second card reader, both the UICC and the CLF can split messages in the format of APDUs, which refers to a data format used between smart cards defined by the ISO.

Also, the present invention provides a method of performing contactless management between a smart card and a contactless function module (CLF) of a mobile terminal, comprising: detecting a need to establish a communication link between the smart card and the CLF; establishing the communication link by using special commands for supporting smart cards; and sending or receiving information between the smart card and the CLF via the established communication link.

The detecting is based on a request for performing a contactless service that supports at least one of transportation access, financial transactions, and user applications. The special commands are modified Card Application Toolkit (CAT) commands that are related to Bearer Independent Protocol (BIP) or related to supporting an additional card reader. For BIP, an open channel command can address the CLF to establish an accurate channel for contactless transactions such that data blocks are managed in accordance with contactless protocol requirements. The sending or receiving of information is performed via an ISO communication bus.

Additionally, the present invention provides a device for performing a method of communication between a smart card and a contactless function module (CLF), the device comprising: a first module that receives an event that indicates a need to establish a channel between the smart card and the CLF; a second module that sets up the channel by using an extension of commands for supporting smart cards; and a third module that sends or receives data between the smart card and the CLF via the channel.

The device can further comprise a communication bus operatively connected with the smart card, the CLF, the first module, the second module, and the third module. The communication bus supports an ISO-based protocol standard. The secure element supports at least one of transportation access and financial transactions. The secure element comprises at least one of a removable hardware element, a UICC, a smart card, a SIM card, a USIM card, and a storage medium.

Industrial Applicability

The features and concepts herein are applicable to and can be implemented for various types of user devices (e.g., mobile terminals, handsets, wireless communication devices, etc.) and/or entities that can support different types of air interfaces, protocols, and applications used in wireless communications.

The described contactless management using USAT commands for a smart card to support various contactless service can be used in a wide variety of fields, such as financial applications (e.g., credit cards, ATM cards, fuel cards, SIM cards for mobile phones, public transportation passes, etc.), identification applications (e.g., personal electronic ID cards, medical ID cards, etc.), security applications (e.g., biometric passports, cryptographic pass cards, employee badges, etc.), and the like.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of communication between a smart card and a contactless function module (CLF) of a terminal, comprising:
   receiving an event, by at least one of a smart card and a terminal that indicates a need to establish a communication bus interface between the smart card and a CLF of the terminal,
   wherein the communication bus supports an ISO-based protocol standard,
   wherein the communication bus supports near field communication (NFC) technology such that signals and data are sent and received between the smart card and the CLF that communicates with a contactless reader via the NFC;
   setting up, by at least one of the smart card and the CLF, the communication bus by using an extension of commands for supporting smart cards; and
   transmitting data, between the smart card and the CLF, via the communication bus,
   wherein the smart card is a UICC (Universal Integrated Circuit Card),
   wherein the commands are extended Card Application Toolkit (CAT) commands,
   wherein the extended CAT commands are related to Bearer Independent Protocol (BIP) or second card reader commands,
   wherein for the BIP, an open channel command is for addressing the CLF to establish an accurate channel for contactless transactions, and
   wherein for the BIP, the terminal is configured to manage data blocks in accordance with contactless protocol requirements.

2. The method of claim 1, wherein the communication to the CLF is considered as a local connection.

3. The method of claim 1, wherein for a second card reader, the CLF is configured to emulate a smart card communication with the UICC.

4. The method of claim 1, wherein for a second card reader, the terminal supports the contactless protocol requirements.

5. The method of claim 1, wherein for a second card reader, both the UICC and the CLF are configured to split messages in the format of APDUs (Application Protocol Data Units).

6. A method of performing contactless management between a smart card and a contactless function module (CLF) of a mobile terminal, comprising:
   detecting a need to establish a communication bus between the smart card and the CLF;
   establishing the communication bus by using special commands for supporting smart cards; and
   sending or receiving information between the smart card and the CLF via the established communication bus, wherein the communication bus supports an ISO-based protocol standard, wherein the communication bus supports near field communication (NFC) technology such that signals and data are sent and received between the smart card and the CLF that communicates with a contactless reader via the NFC;

wherein the detecting is based on a request for performing a contactless service that supports at least one of transportation access, financial transactions, and user applications, wherein the special commands are modified Card Application Toolkit (CAT) commands that are related to Bearer Independent Protocol (BIP) or related to supporting an additional card reader, wherein for the BIP, an open channel command is for addressing the CLF to establish an accurate channel for contactless transactions such that data blocks are managed in accordance with contactless protocol requirements, and wherein the sending or receiving of information is performed via an ISO communication bus.

7. A device for performing a method of communication between a smart card and a contactless function module (CLF), the device comprising:

a first module that receives an event that indicates a need to establish a communication bus between the smart card and the CLF;

a second module that sets up the communication bus by using an extension of commands for supporting smart cards; and a third module that sends or receives data between the smart card and the CLF via the communication bus, wherein the communication bus supports an ISO-based protocol standard, wherein the communication bus supports near field communication (NFC) technology such that signals and data are sent and received between the smart card and the CLF that communicates with a contactless reader via the NFC, wherein the communication bus is operatively connected with the smart card, the CLF, the first module, the second module, and the third module, wherein the smart card supports at least one of transportation access and financial transactions, and wherein the smart card comprises at least one of a removable hardware element, a UICC, a smart card, a SIM card, a USIM card, and a storage medium.

8. A smart card comprising:

a memory to store information related to supporting contactless applications;

an interface element operatively connected with the memory and with a communication bus to allow components of a mobile terminal to access the memory via the communication bus and perform a contactless function with an external terminal using extended commands that are related to Bearer Independent Protocol (BIP) or related to supporting an additional card reader; and embedded integrated circuits that cooperate with the memory and the interface element to receive inputs, process information, and deliver outputs to perform the contactless function, wherein the communication bus supports an ISO-based protocol standard, and wherein the communication bus supports near field communication (NFC) technology such that signals and data are sent and received between the smart card and the CLF that communicates with a contactless reader via the NFC.

* * * * *